United States Patent
Sjoland et al.

(10) Patent No.: US 10,084,506 B2
(45) Date of Patent: Sep. 25, 2018

(54) TRANSCEIVER FRONT-END

(71) Applicant: Telefonaktiebolaget L M Ericsson (publ), Stockholm (SE)

(72) Inventors: Henrik Sjoland, Lund (SE); Stefan Andersson, Lund (SE); Imad ud Din, Lund (SE); Johan Wernehag, Malmo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/440,893

(22) PCT Filed: Nov. 7, 2013

(86) PCT No.: PCT/EP2013/073215
§ 371 (c)(1),
(2) Date: May 6, 2015

(87) PCT Pub. No.: WO2014/075980
PCT Pub. Date: May 22, 2014

(65) Prior Publication Data
US 2015/0303981 A1 Oct. 22, 2015

Related U.S. Application Data

(60) Provisional application No. 61/730,231, filed on Nov. 27, 2012.

(30) Foreign Application Priority Data

Nov. 15, 2012 (EP) ..................................... 12192761

(51) Int. Cl.
*H04B 1/48* (2006.01)
*H04B 1/525* (2015.01)

(52) U.S. Cl.
CPC ............... *H04B 1/48* (2013.01); *H04B 1/525* (2013.01); *H04B 2001/485* (2013.01)

(58) Field of Classification Search
USPC ....................................................... 370/278
See application file for complete search history.

(56) References Cited

U.S. PATENT DOCUMENTS

| | | |
|---|---|---|
| 3,900,823 A | 8/1975 | Sokal et al. |
| 4,325,140 A | 4/1982 | Stitzer |

(Continued)

FOREIGN PATENT DOCUMENTS

| | | |
|---|---|---|
| CN | 102332931 A | 1/2012 |
| EP | 1813030 A1 | 8/2007 |

(Continued)

OTHER PUBLICATIONS

PCT International Search Report, dated Jan. 30, 2014, in connection with International Application No. PCT/EP2013/073215, all pages.

(Continued)

*Primary Examiner* — Gregory Sefcheck
*Assistant Examiner* — Majid Esmaeilian
(74) *Attorney, Agent, or Firm* — Patent Portfolio Builders, PLLC

(57) ABSTRACT

A transceiver front-end for a communication device is connectable to a signal transmission and reception arrangement adapted to transmit a transmit signal having a transmit frequency and to receive a receive signal having a receive frequency. The transceiver front-end is also connectable to a transmitter adapted to produce the transmit signal, and to a receiver adapted to process the receive signal. The transceiver front-end comprises a transmit frequency suppression filter arrangement and a receive frequency suppression filter arrangement. The transmit frequency suppression filter arrangement is adapted to suppress transfer of a signal (Continued)

having the transmit frequency and to pass a signal having the receive frequency. The receive frequency suppression filter arrangement is adapted to suppress transfer of a signal having the receive frequency and to pass a signal having the transmit frequency. The transceiver front-end also comprises a transmit frequency cancellation arrangement and a receive frequency cancellation arrangement. The transmit frequency cancellation arrangement is adapted to produce a first cancellation signal for cancellation, at receiver nodes, of a suppressed signal having the transmit frequency, transferred by the transmit frequency suppression filter arrangement. The receive frequency cancellation arrangement is adapted to produce a second cancellation signal for cancellation, at signal transmission and reception arrangement nodes of a suppressed signal having the receive frequency, transferred by the receive frequency suppression filter arrangement. Corresponding transceiver, communication device and method are also disclosed.

13 Claims, 4 Drawing Sheets

(56) References Cited

U.S. PATENT DOCUMENTS

| | | | |
|---|---|---|---|
| 5,404,375 A | 4/1995 | Kroeger et al. | |
| 5,430,635 A * | 7/1995 | Liu | H02M 1/425 |
| | | | 315/200 R |
| 6,169,912 B1 | 1/2001 | Zuckerman | |
| 6,567,638 B2 | 5/2003 | Ahn Dal et al. | |
| 6,567,648 B1 | 5/2003 | Ahn et al. | |
| 6,567,649 B2 | 5/2003 | Souissi | |
| 6,745,018 B1 | 6/2004 | Lehavi et al. | |
| 7,109,793 B2 | 9/2006 | Nakatani et al. | |
| 7,756,480 B2 | 7/2010 | Loh | |
| 8,654,743 B1 | 2/2014 | Li et al. | |
| 8,755,756 B1 * | 6/2014 | Zhang | H04B 1/109 |
| | | | 455/114.2 |
| 8,797,927 B2 | 8/2014 | Chen | |
| 8,909,161 B2 | 12/2014 | Din et al. | |
| 9,143,186 B2 | 9/2015 | Andersson et al. | |
| 9,344,139 B2 | 5/2016 | Sjoland et al. | |
| 2003/0008693 A1 * | 1/2003 | Tanaka | H01P 1/15 |
| | | | 455/575.1 |
| 2003/0128081 A1 | 7/2003 | Ella et al. | |
| 2003/0193997 A1 | 10/2003 | Dent et al. | |
| 2004/0180633 A1 | 9/2004 | Nakatani et al. | |
| 2005/0035824 A1 | 2/2005 | Kearns | |
| 2005/0046585 A1 | 3/2005 | Dodge | |
| 2005/0170790 A1 | 8/2005 | Chang et al. | |
| 2005/0221790 A1 * | 10/2005 | Persico | H04B 1/1615 |
| | | | 455/343.2 |
| 2006/0028298 A1 * | 2/2006 | Nakamura | H03H 9/0038 |
| | | | 333/133 |
| 2006/0133599 A1 | 6/2006 | Pagnanelli | |
| 2006/0135084 A1 | 6/2006 | Lee | |
| 2006/0261902 A1 | 11/2006 | Masuda et al. | |
| 2007/0015468 A1 | 1/2007 | Kouki et al. | |
| 2007/0117524 A1 | 5/2007 | Do | |
| 2007/0152904 A1 | 7/2007 | Castaneda et al. | |
| 2007/0182509 A1 | 8/2007 | Park et al. | |
| 2007/0202826 A1 | 8/2007 | Dean | |
| 2007/0207747 A1 | 9/2007 | Johnson et al. | |
| 2007/0217488 A1 | 9/2007 | Smaini et al. | |
| 2008/0198733 A1 | 8/2008 | Nagai | |
| 2008/0198773 A1 | 8/2008 | Loh | |
| 2008/0238789 A1 | 10/2008 | Wilcox | |
| 2008/0242235 A1 | 10/2008 | Adler et al. | |
| 2008/0242245 A1 * | 10/2008 | Aparin | H04B 1/525 |
| | | | 455/126 |
| 2008/0279262 A1 | 11/2008 | Shanjani | |
| 2009/0028074 A1 | 1/2009 | Knox | |
| 2009/0253385 A1 | 10/2009 | Dent et al. | |
| 2009/0289739 A1 | 11/2009 | Sasaki et al. | |
| 2010/0035563 A1 | 2/2010 | Mikhemar et al. | |
| 2010/0109800 A1 | 5/2010 | Ueda et al. | |
| 2010/0148886 A1 | 6/2010 | Inoue et al. | |
| 2010/0253477 A1 | 10/2010 | Seppa et al. | |
| 2010/0279617 A1 | 11/2010 | Osman | |
| 2010/0304701 A1 | 12/2010 | Jung et al. | |
| 2011/0051628 A1 * | 3/2011 | Cohen | H04B 1/18 |
| | | | 370/278 |
| 2011/0064004 A1 | 3/2011 | Mikhemar et al. | |
| 2011/0064005 A1 | 3/2011 | Mikhemar et al. | |
| 2011/0124309 A1 | 5/2011 | Trolla et al. | |
| 2011/0158134 A1 | 6/2011 | Mikhemar et al. | |
| 2011/0175789 A1 | 7/2011 | Lee et al. | |
| 2011/0187478 A1 | 8/2011 | Link et al. | |
| 2011/0199142 A1 | 8/2011 | Mu | |
| 2011/0210787 A1 * | 9/2011 | Lee | H03F 1/56 |
| | | | 330/126 |
| 2011/0212692 A1 * | 9/2011 | Hahn | H04B 1/525 |
| | | | 455/63.1 |
| 2011/0221521 A1 | 9/2011 | Razzell et al. | |
| 2011/0299433 A1 | 12/2011 | Darabi et al. | |
| 2011/0299437 A1 | 12/2011 | Mikhemar et al. | |
| 2012/0009886 A1 | 1/2012 | Poulin | |
| 2012/0126907 A1 | 5/2012 | Nakamoto et al. | |
| 2012/0182087 A1 * | 7/2012 | Ye | H03H 9/0571 |
| | | | 333/133 |
| 2012/0195351 A1 | 8/2012 | Banwell et al. | |
| 2013/0063223 A1 | 3/2013 | See et al. | |
| 2013/0077540 A1 | 3/2013 | Black et al. | |
| 2013/0176912 A1 | 3/2013 | Khlat | |
| 2013/0194978 A1 | 8/2013 | Andersson et al. | |
| 2013/0258911 A1 | 10/2013 | Choksi | |
| 2013/0271004 A1 | 10/2013 | Min et al. | |
| 2013/0315116 A1 | 11/2013 | Chen | |
| 2014/0169231 A1 | 6/2014 | Mikhemar et al. | |
| 2014/0169235 A1 | 6/2014 | Mikhemar et al. | |
| 2014/0253236 A1 | 9/2014 | Cheeranthodi et al. | |
| 2014/0315501 A1 | 10/2014 | Rudell et al. | |
| 2014/0364073 A1 | 12/2014 | Sjoland et al. | |
| 2014/0376419 A1 | 12/2014 | Goel et al. | |
| 2015/0156005 A1 | 6/2015 | Sjoland et al. | |
| 2015/0281974 A1 | 10/2015 | Ghasemzadeh et al. | |
| 2015/0303981 A1 | 10/2015 | Sjoland et al. | |
| 2016/0043767 A1 | 2/2016 | Andersson et al. | |
| 2016/0065352 A1 | 3/2016 | Sjoland et al. | |
| 2016/0072542 A1 | 3/2016 | Din et al. | |

FOREIGN PATENT DOCUMENTS

| | | |
|---|---|---|
| EP | 1813030 B1 | 8/2007 |
| EP | 2 226 948 A1 | 9/2010 |
| EP | 2226948 A1 | 9/2010 |
| EP | 2226948 B1 | 9/2010 |
| EP | 2296286 A2 | 3/2011 |
| EP | 2388927 A2 | 11/2011 |
| EP | 2672631 A1 | 12/2013 |
| RU | 2264032 C2 | 11/2005 |
| WO | 2006068635 A1 | 6/2006 |
| WO | 2007006840 A8 | 6/2007 |
| WO | 2007149954 A1 | 12/2007 |
| WO | 2009080878 A1 | 7/2009 |
| WO | 2011146404 A1 | 11/2011 |
| WO | 2014079501 A1 | 5/2014 |
| WO | 2014173459 A1 | 10/2014 |
| WO | 2014177191 A1 | 11/2014 |

OTHER PUBLICATIONS

PCT Written Opinion, dated Jan. 30, 2014, in connection with International Application No. PCT/EP2013/073215, all pages.
PCT International Search Report, dated May 2, 2013, in connection with International Application No. PCT/EP2013/051520, all pages.
PCT Written Opinion, dated May 2, 2013, in connection with International Application No. PCT/EP2013/051520, all pages.

(56) References Cited

OTHER PUBLICATIONS

PCT International Search Report, dated Sep. 24, 2014, in connection with International Application No. PCT/EP2014/051155, all pages.
PCT Written Opinion, dated Sep. 24, 2014, in connection with International Application No. PCT/EP2014/051155, all pages.
PCT International Search Report, dated Jun. 29, 2015, in connection with International Application No. PCT /EP2015/051021, all pages.
PCT Written Opinion, dated Jun. 29, 2015, in connection with International Application No. PCT /EP2015/051021, all pages.
Non-Final Office Action dated Jul. 24, 2015 in connection with U.S. Appl. No. 14/373,419, 15 pages.
Notice of Allowance dated Jan. 21, 2016 in connection with U.S. Appl. No. 14/373,419, 8 pages.
Office Action dated Aug. 11, 2016 in connection with U.S. Appl. No. 14/440,893, all pages.
Office Action dated May 31, 2017 in connection with U.S. Appl. No. 14/654,655, 14 pages.
Office Action dated Nov. 13, 2017 in connection with U.S. Appl. No. 14/654,655, 29 pages.
Pekka Pursula et al., "Hybrid Transformer-Based Adaptive RF Front End for UHF RFID Mobile Phone Readers," 2008 IEEE International Conference on RFID, The Venetian, Las Vegas, Nevada, USA, Apr. 16-17, 2008, pp. 150-155.
Mohyee Mikhemar et al., "An On-Chip Wideband and Low-Loss Duplexer for 3G/4G CMOS Radios," 2010 Symposium on VLSI Circuits/Technical Digest of Technical Papers, pp. 129-130.
Ahmed M Elzayat et al., "Tx/Rx Isolation Enhancement Based on a Novel Balanced Duplexer Architecture," Microwave Symposium Digest (MTT), Jun. 5, 2011, pp. 1-4.
Russian Office Action dated Jul. 26, 2016 in connection with Russian Application No. 2015143996107(067790), all pages.
English translation of Russian Office Action dated Jul. 26, 2016 in connection with Russian Application No. 2015143996/07(067790), all pages.
L. Larson et al., "4th Generation Wireless Transceiver Design," Bipolar/Bicmos Circuits and Technology Meeting (BCTM), 2010 IEEE, Piscataway, NJ, USA, Oct. 4, 2019, pp. 113-120.
M Mikhemar et al., "A Tunable Integrated Duplexer and 50dB Isolation in 40 nm CMOS," 2009 IEEE International Solid-State Circuits Conference, ISSCC 2009, Session 22, PA and Antenna Interface, 22/7, 3 pages.

* cited by examiner

TRANSCEIVER FRONT-END

CROSS-REFERENCE TO RELATED APPLICATIONS

This application claims priority under 35 U.S.C. § 119 to European Patent Application No. 12192761.0, filed Nov. 15, 2012, which is hereby incorporated herein by reference in its entirety. This application also claims the benefit of U.S. Provisional Application No. 61/730,231, filed Nov. 27, 2012, which is hereby incorporated herein by reference in its entirety.

TECHNICAL FIELD

The present invention relates generally to the field of transceiver front-ends for communication devices. More particularly, it relates to transceiver front-ends providing isolation between a transmitter and a receiver.

BACKGROUND

In transceivers for frequency division duplex (FDD) communication (e.g. a transceiver of a cellular radio equipment), the receiver typically experiences strong interference signals from the transmitter of the same transceiver.

The interference signal from the transmitter has a carrier frequency at duplex distance from the carrier frequency of the receive signal. A typical duplex distance is small compared to the carrier frequencies. Typically, the duplex distance may be less than 100 MHz while the carrier frequencies may, for example, be somewhere between 700 MHz and 3 GHz.

To be able to operate with required performance (e.g. achieving good sensitivity), the receiver should preferably be shielded (or isolated) from the interference from the transmitter of the transceiver, both from transmitter signals at transmit frequency and transmitter generated interference at receive frequency. It is also desirable that the transmitter is shielded (or isolated) from the received signals. Example reasons include that as much of the received energy as possible should be transferred to the receiver for optimal receiver performance and that received signals occurring at the transmitter output may cause interference to the signal to be transmitted.

Such isolation is typically achieved by off-chip acoustic wave duplex filters (duplexers). A drawback with duplexers is that they are typically expensive. They are also bulky which increases the size of a transceiver implementation. Duplexers are also fixed in frequency, which necessitates several duplexers to be used if several frequency bands are to be supported. These problems are becoming more pronounced as the number of frequency bands to be supported by a communication device is increased.

Therefore, there is a need for multi-band solutions that provide isolation between a transmitter and a receiver.

A typical multi-band isolation implementation is based on cancellation of the interferer signal. To achieve perfect cancellation of transmit signals at the receiver input symmetry is necessary, and the circuit requires a dummy load that equals the antenna impedance both at the receive frequency and at the transmit frequency. If the antenna impedance is complex (inductive or capacitive) and/or varies over time (e.g. due to frequency changes and/or changing antenna surroundings), implementation of a perfect cancellation becomes cumbersome, e.g. since the dummy load must track the antenna impedance at both receive frequency and transmit frequency simultaneously. Furthermore, approximately 3 dB of the power of receive and transmit signals will be lost in the dummy load.

A typical multi-band isolation implementation also uses a transformer. A drawback with such an implementation is that on-chip transformers are cumbersome to implement. This problem further contributes to imperfections and losses in such implementations.

US 2011/0064004 A1 discloses a radio frequency (RF) front-end comprising a power amplifier (PA), a noise-matched low-noise amplifier (LNA), a balance network, and a four-port isolation module. The isolation module isolates the third port from the fourth port to prevent strong outbound signals received at the third port from saturating the LNA coupled to the fourth port. Isolation is achieved via electrical balance.

Similarly as described above, a drawback of this solution is that the balance network needs to track impedance changes in the antenna during operation to enable sufficient isolation. The impedance needs to be tracked at both receive frequency and transmit frequency simultaneously. Thus, the implementation is sensitive and complex. Further drawbacks of this solution are that approximately 3 dB of the power of receive and transmit signals will be lost due to the matched impedance of the balance network and that it requires a transformer.

Therefore, there is a need for alternative and improved multi-band solutions that provide isolation between a transmitter and a receiver.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved multi-band solutions that provide isolation between a transmitter and a receiver.

According to a first aspect, this is achieved by a transceiver front-end for a communication device. The transceiver front-end is connectable at one or more signal transmission and reception arrangement nodes to a signal transmission and reception arrangement adapted to transmit a transmit signal having a transmit frequency and to receive a receive signal having a receive frequency, at one or more transmitter nodes to a transmitter adapted to produce the transmit signal, and at one or more receiver nodes to a receiver adapted to process the receive signal.

The signal transmission and reception arrangement may comprise an antenna according to some embodiments. In some embodiments, the signal transmission and reception arrangement may comprise two or more antennas, an antenna array, an antenna matrix, or any other suitable antenna arrangement.

The transceiver front-end comprises a transmit frequency suppression filter arrangement, a transmit frequency cancellation arrangement, a receive frequency suppression filter arrangement and a receive frequency cancellation arrangement.

The transmit frequency suppression filter arrangement is connected to the signal transmission and reception arrangement nodes and to the receiver nodes. It is adapted to suppress transfer of a signal having the transmit frequency and to pass a signal having the receive frequency.

The receive frequency suppression filter arrangement is connected to the signal transmission and reception arrangement nodes and to the transmitter nodes. It is adapted to suppress transfer of a signal having the receive frequency and to pass a signal having the transmit frequency.

The transmit frequency cancellation arrangement is connected to the signal transmission and reception arrangement nodes and to the receiver nodes. It is adapted to produce one or more first cancellation signals for cancellation, at the receiver nodes, of a suppressed signal having the transmit frequency, transferred by the transmit frequency suppression filter arrangement.

The receive frequency cancellation arrangement is connected to the signal transmission and reception arrangement nodes and to the transmitter nodes. It is adapted to produce one or more second cancellation signals for cancellation, at the signal transmission and reception arrangement nodes, of a suppressed signal having the receive frequency, transferred by the receive frequency suppression filter arrangement.

The transmit and receive frequency suppression filter arrangements may, for example, comprise one or more filters.

In some embodiments, the transmit frequency suppression filter arrangement may be adapted to have a higher impedance value at the transmit frequency than at the receive frequency, and the receive frequency suppression filter arrangement may be adapted to have a higher impedance value at the receive frequency than at the transmit frequency.

The transmit and receive frequency cancellation arrangements may, for example, comprise one or more impedances (e.g. pure resistances or complex impedances) or one or more transconductances.

In some embodiments, the transmit frequency cancellation arrangement is adapted to produce the first cancellation signals as one or more currents matching a respective current of the suppressed signal having the transmit frequency, and the receive frequency cancellation arrangement is adapted to produce the second cancellation signals as one or more currents matching a respective current of the suppressed signal having the receive frequency.

In some embodiments, the transmit frequency cancellation arrangement is adapted to produce the first cancellation signals as one or more currents having substantially opposite phase and substantially equal magnitude as a respective current of the suppressed signal having the transmit frequency, and the receive frequency cancellation arrangement is adapted to produce the second cancellation signals as one or more currents having substantially opposite phase and substantially equal magnitude as a respective current of the suppressed signal having the receive frequency.

For example, the first cancellation signals may be produced as one or more currents (in a direction from the signal transmission and reception arrangement to the receiver) having substantially opposite phase and substantially equal magnitude as the respective current (in a direction from the signal transmission and reception arrangement to the receiver) of the suppressed signal having the transmit frequency such that when each of the first cancellation signal currents is joined (added, merged, or similar) with its respective current of the suppressed signal having the transmit frequency, the respective current of the suppressed signal having the transmit frequency is cancelled or at least reduced. In a similar example, the second cancellation signals may be produced as one or more currents (in a direction from the transmitter to the signal transmission and reception arrangement) having substantially opposite phase and substantially equal magnitude as the respective current (in a direction from the transmitter to the signal transmission and reception arrangement) of the suppressed signal having the receive frequency such that when each of the second cancellation signal currents is joined (added, merged, or similar) with its respective current of the suppressed signal having the receive frequency, the respective current of the suppressed signal having the receive frequency is cancelled or at least reduced.

In some of these embodiments, the first cancellation signals are produced as currents having opposite phase and equal magnitude as the respective current of the suppressed signal having the transmit frequency, and the second cancellation signals are produced as currents having opposite phase and equal magnitude as the respective current of the suppressed signal having the receive frequency.

That a first phase is substantially opposite to a second phase may, for example, be defined as the absolute difference between the first and second phases falling within the interval $[0.8\pi; 1.27\pi]$. In another example, a first phase may be defined as being substantially opposite to a second phase if the absolute difference between the first and second phases falls within the interval [140; 220] degrees. That a first magnitude is substantially equal to a second magnitude may, for example, be defined as the absolute difference between the first and second magnitudes (normalized by the first or second magnitude depending on the definition) falling within the interval of [0; 0.2].

According to some embodiments, the transceiver front-end is further adapted to join each of the first cancellation signal currents with its respective current of the suppressed signal having the transmit frequency and to join each of the second cancellation signal currents with its respective current of the suppressed signal having the receive frequency.

The transceiver front-end may, in some embodiments, further comprise a first signal adder adapted to (for each of the one or more first cancellation signals) add the first cancellation signal to a respective suppressed signal having the transmit frequency and transferred by the transmit frequency suppression filter arrangement, and output a first further suppressed signal having a magnitude that is lower than a magnitude of the respective suppressed signal having the transmit frequency. Similarly, the transceiver front-end may, in some embodiments, further comprise a second signal adder adapted to (for each of the one or more second cancellation signals) add the second cancellation signal to a respective suppressed signal having the receive frequency and transferred by the receive frequency suppression filter arrangement, and output a second further suppressed signal having a magnitude that is lower than a magnitude of the respective suppressed signal having the receive frequency.

In some embodiments, at least one of the magnitude of the first further suppressed signal and the magnitude of the second further suppressed signal is equal to zero (or at least substantially equal to zero).

According to some embodiments, the one or more signal transmission and reception arrangement nodes comprise first and second signal transmission and reception arrangement nodes, the one or more transmitter nodes comprise first and second transmitter nodes, and the one or more receiver nodes comprise first and second receiver nodes. Such embodiments are particularly suitable when differential components (e.g. a differential output transmitter, a differential input receiver and a differential antenna port) are considered for use with the transceiver front-end.

In these embodiments, the transmit frequency suppression filter arrangement may comprise a first transmit frequency suppression filter connected between the first signal transmission and reception arrangement node and the first receiver node, and a second transmit frequency suppression filter connected between the second signal transmission and reception arrangement node and the second receiver node. The receive frequency suppression filter arrangement may comprise a first receive frequency suppression filter connected between the first signal transmission and reception arrangement node and the first transmitter node, and a second receive frequency suppression filter connected between the second signal transmission and reception arrangement node and the second transmitter node.

The transmit frequency cancellation arrangement may, in such embodiments, comprise a first transmit frequency cancellation impedance connected between the second signal transmission and reception arrangement node and the first receiver node, and a second transmit frequency cancellation impedance connected between the first signal transmission and reception arrangement node and the second receiver node. The receive frequency cancellation arrangement may comprise a first receive frequency cancellation impedance connected between the second signal transmission and reception arrangement node and the first transmitter node, and a second receive frequency cancellation impedance connected between the first signal transmission and reception arrangement node and the second transmitter node.

In such embodiments, the one or more first and second cancellation signals typically comprise two first cancellation signals and two second cancellation signals, each of which may be produced as a current having opposite phase and equal magnitude as a respective current of the suppressed signal to be cancelled.

According to some embodiments, the one or more signal transmission and reception arrangement nodes comprise one signal transmission and reception arrangement node, the one or more transmitter nodes comprise one transmitter node, and the one or more receiver nodes comprise one receiver node. Such embodiments are particularly suitable when single-ended components are considered for use with the transceiver front-end.

In these embodiments, the transmit frequency suppression filter arrangement may comprise a transmit frequency suppression filter connected between the signal transmission and reception arrangement node and the receiver node. The receive frequency suppression filter arrangement may comprise a receive frequency suppression filter connected between the signal transmission and reception arrangement node and the transmitter node.

The transmit frequency cancellation arrangement may, in such embodiments, comprise a first inverting transconductor (forming a transmit frequency cancellation transconductance) connected between the signal transmission and reception arrangement node and the receiver node. The receive frequency cancellation arrangement may comprise a second inverting transconductor (forming a receive frequency cancellation transconductance) connected between the signal transmission and reception arrangement node and the transmitter node.

In such embodiments, the one or more first and second cancellation signals typically comprise one first cancellation signal and one second cancellation signal, each of which may be produced as a current having opposite phase and equal magnitude as a respective current of the suppressed signal to be cancelled.

In some embodiments, each of the suppression filters comprises a first inductance connected in parallel with a first capacitance to form a suppression frequency resonance arrangement. Each of the suppression filters may further comprise at least one of a second inductance and a second capacitance connected in series with the suppression frequency resonance arrangement to form a pass frequency resonance arrangement.

One or more of the suppression filter arrangements and the cancellation arrangements may be tunable according to various embodiments. In some embodiments, it may be possible to vary the frequency ranges of the suppression filters. For example, the first and second capacitances may be tunable (e.g. by switching) so that the frequency ranges of the filters may be varied. In some embodiments, it may be possible to vary the impedance values and/or transconductance values of the cancellation arrangements in various frequency ranges. For example, a magnitude may be varied by variable resistances (switching of a resistance value) and an impedance phase may be varied by variable capacitances (switching of a capacitance value). A variable resistance may, for example, be implemented as a switchable array of resistors and a variable capacitance may, for example, be implemented as a switchable array of capacitors.

According to a second aspect a transceiver is provided comprising the transceiver front-end of the first aspect and further comprising the transmitter and the receiver.

In some embodiments, the transceiver of the second aspect may further comprise the signal transmission and reception arrangement.

A third aspect is a communication device comprising the transceiver of the second aspect.

In a fourth aspect, a method is provided for minimizing signal leakage from a transmitter to a receiver in a receiver front-end of a communication device. The transceiver front-end is connectable at one or more signal transmission and reception arrangement nodes to a signal transmission and reception arrangement adapted to transmit a transmit signal having a transmit frequency and to receive a receive signal having a receive frequency, at one or more transmitter nodes to a transmitter adapted to produce the transmit signal, and at one or more receiver nodes to a receiver adapted to process the receive signal.

The method comprises constructing a transmit frequency suppression filter arrangement adapted to suppress transfer of a signal having the transmit frequency and to pass a signal having the receive frequency, and connecting the transmit frequency suppression filter arrangement to the signal transmission and reception arrangement nodes and to the receiver nodes.

The method also comprises constructing a transmit frequency cancellation arrangement for provision of one or more first cancellation signals for cancellation, at the receiver nodes, of a suppressed signal having the transmit frequency, transferred by the transmit frequency suppression filter arrangement, and connecting the transmit frequency cancellation arrangement to the signal transmission and reception arrangement nodes and to the receiver nodes so that one or more currents of the first cancellation signals have opposite phase and equal magnitude as a respective current of the suppressed signal having the transmit frequency.

Further, the method comprises constructing a receive frequency suppression filter arrangement adapted to suppress transfer of a signal having the receive frequency and to pass a signal having the transmit frequency, and connecting the receive frequency suppression filter arrangement to the signal transmission and reception arrangement nodes and to the transmitter nodes.

Yet further, the method comprises constructing a receive frequency cancellation arrangement for provision of one or more second cancellation signals for cancellation, at the signal transmission and reception arrangement nodes, of a suppressed signal having the receive frequency, transferred by the receive frequency suppression filter arrangement, and connecting the receive frequency cancellation arrangement to the signal transmission and reception arrangement nodes and to the transmitter nodes so that one or more currents of the second cancellation signals have opposite phase and equal magnitude as a respective current of the suppressed signal having the receive frequency.

According to some embodiments, the one or more signal transmission and reception arrangement nodes may comprise first and second signal transmission and reception arrangement nodes, the one or more transmitter nodes may comprise first and second transmitter nodes, and the one or more receiver nodes may comprise first and second receiver nodes.

In such embodiments, constructing and connecting the transmit frequency suppression filter arrangement may comprise connecting a first transmit frequency suppression filter between the first signal transmission and reception arrangement node and the first receiver node and connecting a second transmit frequency suppression filter between the second signal transmission and reception arrangement node and the second receiver node, and constructing and connecting the transmit frequency cancellation arrangement may comprise connecting a first transmit frequency cancellation impedance between the second signal transmission and reception arrangement node and the first receiver node and connecting a second transmit frequency cancellation impedance between the first signal transmission and reception arrangement node and the second receiver node.

Also in such embodiments, constructing and connecting the receive frequency suppression filter arrangement may comprise connecting a first receive frequency suppression filter between the first signal transmission and reception arrangement node and the first transmitter node and connecting a second receive frequency suppression filter between the second signal transmission and reception arrangement node and the second transmitter node, and constructing and connecting the receive frequency cancellation arrangement may comprise connecting a first receive frequency cancellation impedance between the second signal transmission and reception arrangement node and the first transmitter node and connecting a second receive frequency cancellation impedance between the first signal transmission and reception arrangement node and the second transmitter node.

In some embodiments of the fourth aspect, the one or more signal transmission and reception arrangement nodes may comprise one signal transmission and reception arrangement node, the one or more transmitter nodes may comprise one transmitter node, and the one or more receiver nodes may comprise one receiver node.

In these embodiments, constructing and connecting the transmit frequency suppression filter arrangement may comprise connecting a transmit frequency suppression filter between the signal transmission and reception arrangement node and the receiver node, and constructing and connecting the transmit frequency cancellation arrangement may comprise connecting an inverting transconductor forming a transmit frequency cancellation transconductance between the signal transmission and reception arrangement node and the receiver node.

Also in these embodiments, constructing and connecting the receive frequency suppression filter arrangement may comprise connecting a receive frequency suppression filter between the signal transmission and reception arrangement node and the transmitter node, and constructing and connecting the receive frequency cancellation arrangement may comprise connecting an inverting transconductor forming a receive frequency cancellation transconductance between the signal transmission and reception arrangement node and the transmitter node.

In some embodiments, the second, third and fourth aspects may additionally have features identical with or corresponding to any of the various features as explained above for the first aspect.

An advantage of some embodiments is that a possibility to implement an (at least partly) integrated solution for isolation between a transmitter and a receiver is provided. An isolation construction is provided that may easily be (at least partly) implemented on-chip. For example, the construction does not comprise any transformers.

Since the construction does not comprise any transformers, there is less power loss than in a construction comprising transformers.

The construction may be provided in a fully differential structure, which makes it more robust to interference and thereby also makes it suitable for system-on-chip implementation.

Another advantage of some embodiments is that power loss due to a dummy load is avoided.

A further advantage with some embodiments is that matching of a dummy load to antenna impedance is avoided.

Yet a further advantage with some embodiments is that tracking of changing antenna impedance is not necessary.

In fact, the construction according to some embodiments (e.g. those with two pairs of cancellation arrangements, one pair cross coupled between the receiver nodes and the transmission and reception arrangement nodes, and another pair between the transmitter nodes and the transmission and reception arrangement nodes) is completely insensitive to varying antenna impedance.

Some embodiments provide solutions for isolation between a transmitter and a receiver that are simple and area efficient (e.g. two or more filter arrangements and two or more cancellation arrangements, which typically each comprise two impedances or a transconductance).

Furthermore, the solutions according to some embodiments provide isolation while having low power consumption.

Since the cancellation construction may be entirely passive according to some embodiments (e.g. resistive cancellation arrangements) the amplitude linearity of the cancellation signal can be very high, which in turn may provide for low intermodulation and harmonic distortion.

The isolation solutions provided by some embodiments are easily tunable due to the variable filter arrangements and cancellation arrangements. This provides for the possibility to cover a wide range of transmit and receive frequencies with a single (or very few) transceiver front-end arrangement(s). In some embodiments, the tuning is achieved by variable capacitors and/or resistances.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where transceiver structures are provided comprising a receiver, a transmitter, a signal transmission and reception arrangement (e.g. an antenna), and a transceiver front-end. The transceiver front-end of the embodiments is connectable to the signal transmission and reception arrangement, the transmitter and the receiver. Each of the respective connection interfaces may, for example, be single ended (comprising one connection node) or differential (comprising two connection nodes).

The transmitter is adapted to produce a transmit signal having a transmit frequency. The transmit signal is intended for transmission by the signal transmission and reception arrangement. The receiver is adapted to process a receive signal received by the signal transmission and reception arrangement and having a receive frequency. Even though the transmit signal is intended for the signal transmission and reception arrangement, part of the transmit frequency may leak to the receiver. It is desired to eliminate or at least minimize this leakage. Furthermore, the transmitter may also produce an unwanted signal component at a receive frequency. It is also desired to minimize appearance of this signal component at the signal transmission and reception arrangement as well as at the receiver.

Figure 1:
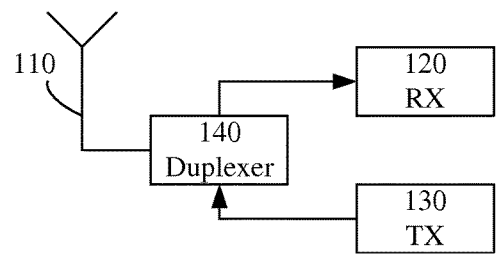
FIG. 1 is a schematic drawing illustrating a prior art transceiver arrangement.

FIG. 1 illustrates a typical transceiver arrangement according to the prior art. The typical transceiver comprises a receiver (RX) 120, a transmitter (TX) 130, an antenna 110, and a duplexer 140 implemented as a separate module. The duplexer provides the desirable isolation between the transmitter and the receiver. As mentioned before, some disadvantages of such a duplexer implementation is that it is typically expensive and large, and several instances of the duplexer filters may be necessary to cover various frequency ranges.

Embodiments of the invention provide a different implementation of the desired isolation. The transceiver front-end of the embodiments comprises a transmit frequency suppression filter arrangement, a transmit frequency cancellation arrangement, a receive frequency suppression filter arrangement and a receive frequency cancellation arrangement.

The transmit frequency suppression filter arrangement is connectable between the signal transmission and reception arrangement and the receiver and is adapted to suppress transfer of a signal having the transmit frequency and to pass a signal having the receive frequency. Hence, transmit frequency signal leakage to the receiver is suppressed.

The receive frequency suppression filter arrangement is connectable between the signal transmission and reception arrangement and the transmitter and is adapted to suppress transfer of a signal having the receive frequency and to pass a signal having the transmit frequency. Hence, leakage from the transmitter to the signal transmission and reception arrangement and to the receiver of signals having the receive frequency is suppressed.

The transmit and receive frequency suppression filter arrangements may typically comprise filters that are easily tunable to a wide variety of frequencies as will be described later. This has the benefit that only one (or very few) set of transmit and receive frequency suppression filter arrangements are needed to cover a large range of applicable frequencies. Furthermore, the solution is (at least to some parts) suitable for on-chip implementation.

When realizing filter implementations, non-perfect inductors and capacitors (e.g. having finite quality factors) must be used. An effect of this is that the filters present a resistive path instead of an open circuit at their respective blocking (suppression) frequency. These resistive paths cause imperfect isolation.

Thus, even though the transmit and receive frequency suppression filter arrangements decrease appearance of transmit frequency signals at the receiver and of unwanted receive frequency signals (i.e. originating from the transmitter) at the receiver and at the signal reception and transmission arrangement, some signal leakage may remain even when the transmit and receive frequency suppression filter arrangements have been applied.

According to some embodiments, such signal leakage is further decreased or even completely cancelled by application of the transmit and receive frequency cancellation arrangements.

The transmit frequency cancellation arrangement is connectable between the signal transmission and reception arrangement and the receiver and is adapted to produce one or more transmit frequency cancellation signals. The transmit frequency cancellation signals are intended to cancel out (or at least decrease), at the receiver, any transmit frequency signals, i.e. signals having the transmit frequency and leaked by the transmit frequency suppression filter arrangement. Thus, the leaked signal having the transmit frequency may be denoted as a suppressed signal having the transmit frequency, transferred by the transmit frequency suppression filter arrangement. The transmit frequency cancellation arrangement typically produces the transmit frequency cancellation signals by letting signals at the signal transmission and reception arrangement pass though an impedance or transconductance arrangement. The impedance or transconductance arrangement may be chosen such that the signals after passage (in a direction towards the receiver) have the same amplitude and opposite phase as the respective signals leaked by the transmit frequency suppression filter arrangement (in a direction towards the receiver). Cancellation may then be achieved, for example, by addition or merge of the transmit frequency cancellation signals and the signals leaked by the transmit frequency suppression filter arrangement.

The receive frequency cancellation arrangement is connectable between the signal transmission and reception arrangement and the transmitter and is adapted to produce one or more receive frequency cancellation signals. The receive frequency cancellation signals are intended to cancel out (or at least decrease), at the signal transmission and reception arrangement (and thereby also at the receiver), any unwanted receive frequency signals, i.e. signals having the receive frequency and leaked from the transmitter by the receive frequency suppression filter arrangement. Thus, the leaked signal having the receive frequency may be denoted as a suppressed signal having the receive frequency, transferred by the receive frequency suppression filter arrangement. The receive frequency cancellation arrangement typically produces the receive frequency cancellation signals by letting signals at the transmitter output pass though an impedance or transconductance arrangement. The impedance or transconductance arrangement may be chosen such that the signals after passage (in a direction towards the signal transmission and reception arrangement) have the same amplitude and opposite phase as the respective signals leaked by the receive frequency suppression filter arrangement (in a direction towards the signal transmission and reception arrangement). Cancellation may then be achieved, for example, by addition or merge of the receive frequency cancellation signals and the signals leaked by the receive frequency suppression filter arrangement.

Figure 2:
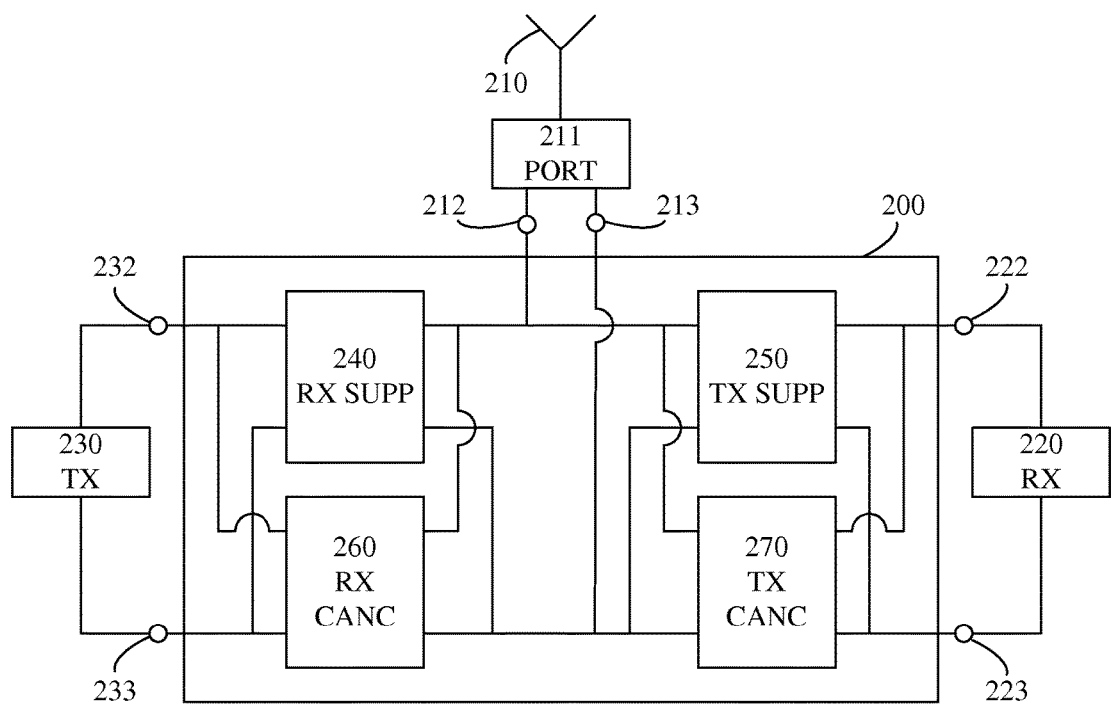
FIG. 2 is a schematic drawing illustrating an example transceiver arrangement according to some embodiments.

FIG. 2 illustrates an example transceiver arrangement according to some embodiments. This example transceiver arrangement comprises a receiver (RX) 220, a transmitter (TX) 230, a signal transmission and reception arrangement 210 with a signal transmission and reception arrangement port (PORT, e.g. an antenna port) 211, and a transceiver front-end 200.

The transceiver front-end 200 is connectable to the signal transmission and reception arrangement 210 via the signal transmission and reception arrangement port 211 at signal transmission and reception arrangement nodes 212, 213. The transceiver front-end 200 is also connectable to the transmitter 230 at transmitter nodes 232, 233 and to the receiver 220 at receiver nodes 222, 223. Thus, this example transceiver comprises a differential structure of the transmitter output, the receiver input and of the signal transmission and reception arrangement port.

The transceiver front-end 200 comprises a transmit frequency suppression filter arrangement (TX SUPP) 250, a transmit frequency cancellation arrangement (TX CANC) 270, a receive frequency suppression filter arrangement (RX SUPP) 240 and a receive frequency cancellation arrangement (RX CANC) 260.

The transmit frequency suppression filter arrangement 250 is connected between the signal transmission and reception arrangement nodes 212, 213 and the receiver nodes 222, 223 and is adapted to suppress transfer of a signal having the transmit frequency and to pass a signal having the receive frequency. The receive frequency suppression filter arrangement 240 is connected between the signal transmission and reception arrangement nodes 212, 213 and the transmitter nodes 232, 233 and is adapted to suppress transfer of a signal having the receive frequency and to pass a signal having the transmit frequency. Structural examples of the transmit and receive frequency suppression filter arrangements 250, 240 will be given in connection to FIGS. 3, 6A and 6B.

The transmit frequency cancellation arrangement 270 is connected between the signal transmission and reception arrangement nodes 212, 213 and the receiver nodes 222, 223 and is adapted to produce two transmit frequency cancellation signals to cancel out (or at least decrease) signals having the transmit frequency at the receiver nodes 222, 223. The receive frequency cancellation arrangement 260 is connected between the signal transmission and reception arrangement nodes 212, 213 and the transmitter nodes 232, 233 and is adapted to produce two receive frequency cancellation signals to cancel out (or at least decrease) unwanted signals having the receive frequency—i.e. receive frequency signals produced by the transmitter 230—at the signal transmission and reception arrangement nodes 212, 213 (and thereby also at the receiver nodes 222, 223). Structural examples of the transmit and receive frequency cancellation arrangements 270, 260 will be given in connection to FIG. 3.

Figure 3:
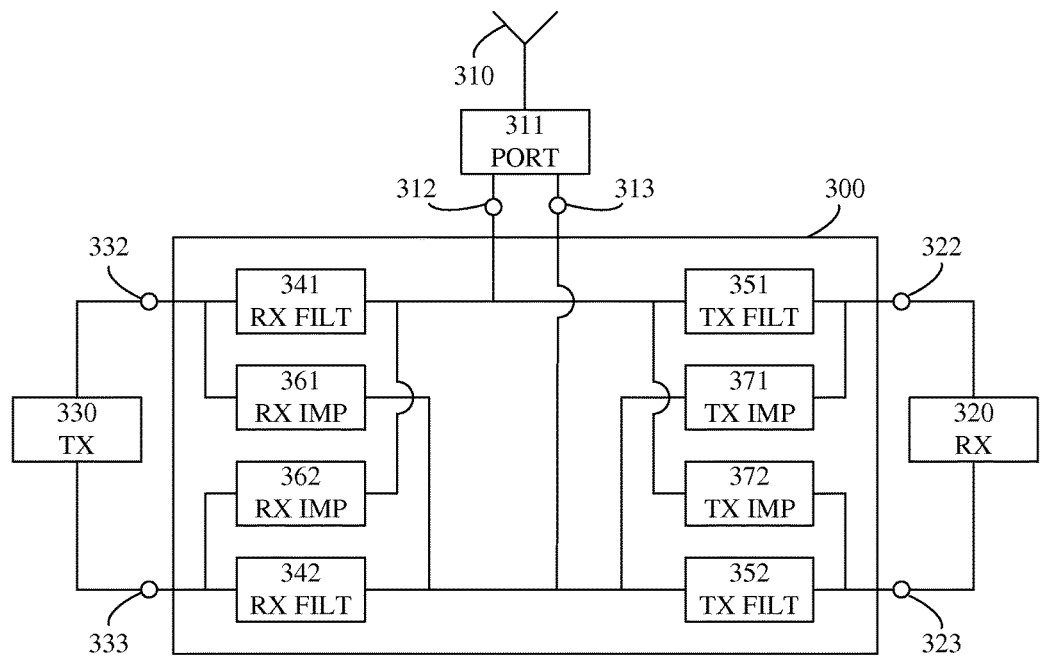
FIG. 3 is a schematic drawing illustrating a detailed example transceiver arrangement according to some embodiments.

FIG. 3 illustrates an example transceiver arrangement according to some embodiments. This example transceiver arrangement comprises a receiver (RX) 320, a transmitter (TX) 330, a signal transmission and reception arrangement 310 with a signal transmission and reception arrangement port (PORT, e.g. an antenna port) 311, and a transceiver front-end 300. The transceiver front-end 300 may be seen as an example implementation of the transceiver front-end 200 of FIG. 2.

Similarly to the transceiver front-end 200 of FIG. 2, the transceiver front-end 300 is connectable to the signal transmission and reception arrangement 310 via the signal transmission and reception arrangement port 311 at signal transmission and reception arrangement nodes 312, 313. The transceiver front-end 300 is also connectable to the transmitter 330 at transmitter nodes 332, 333 and to the receiver 320 at receiver nodes 322, 323.

The transceiver front-end 300 comprises two transmit frequency suppression filters (TX FILT) 351, 352, together forming a transmit frequency suppression filter arrangement, and two receive frequency suppression filters (RX FILT) 341, 342, together forming a receive frequency suppression filter arrangement.

The transmit frequency suppression filter 351 is connected between a first signal transmission and reception arrangement node 312 and a first receiver node 322, while the transmit frequency suppression filter 352 is connected between a second signal transmission and reception arrangement node 313 and a second receiver node 323. Similarly, the receive frequency suppression filter 341 is connected between a first signal transmission and reception arrangement node 312 and a first transmitter node 332, while the receive frequency suppression filter 342 is connected between a second signal transmission and reception arrangement node 313 and a second transmitter node 333.

The transmit frequency suppression filters 351, 352 are adapted to suppress transfer of a signal having the transmit frequency and to pass a signal having the receive frequency. Typically, the transmit frequency suppression filters are adapted to have a higher impedance value at the transmit frequency than at the receive frequency. In some embodiments, the transmit frequency suppression filters 351, 352 are designed to be as identical as possible to each other. The receive frequency suppression filters 341, 342 are adapted to suppress transfer of a signal having the receive frequency and to pass a signal having the transmit frequency. Typically, the receive frequency suppression filters are adapted to have a higher impedance value at the receive frequency than at the transmit frequency. In some embodiments, the receive frequency suppression filters 341, 342 are designed to be as identical as possible to each other. Structural examples of the transmit and receive frequency suppression filters 351, 352, 341, 342 will be given in connection to FIGS. 6A and 6B.

The transceiver front-end 300 also comprises two transmit frequency cancellation impedances (TX IMP) 371, 372, together forming a transmit frequency cancellation arrangement, and two receive frequency cancellation impedances (RX IMP) 361, 362, together forming a receive frequency cancellation arrangement.

The transmit frequency cancellation impedance 371 is connected between the second signal transmission and reception arrangement node 313 and the first receiver node 322, while the transmit frequency cancellation impedance 372 is connected between the first signal transmission and reception arrangement node 312 and the second receiver node 323. Similarly, the receive frequency cancellation impedance 361 is connected between the second signal transmission and reception arrangement node 313 and the first transmitter node 332, while the receive frequency cancellation impedance 362 is connected between the first signal transmission and reception arrangement node 312 and the second transmitter node 333. Thus, the transmit frequency cancellation impedances 371, 372 form a cross-coupling of impedances across the transmit frequency suppression filters 351, 352 and the receive frequency cancellation impedances 361, 362 form a cross-coupling of impedances across the receive frequency suppression filters 341, 342.

The transmit frequency cancellation impedance 371 is adapted to produce a signal that, when it is joined (added, merged, or similar) with the signal leaked through the transmit frequency suppression filter 351, causes the leaked transmit frequency signal to be cancelled or at least reduced. Thus, it may be desirable that the transmit frequency cancellation impedance 371 produces a signal current having equal magnitude and opposite phase (at transmit frequency) as the transmit frequency signal leaked through the transmit frequency suppression filter 351. If a pure resistance is used as the transmit frequency cancellation impedance 371, the resistance value may be chosen so that the amplitude of the produced current matches the amplitude of the signal leaked through the transmit frequency suppression filter 351 and the cross-coupling of the transmit frequency cancellation impedance 371 from the second signal transmission and reception arrangement node 313 to the first receiver node 322 results in an opposite phase current, as desired. Instead of a pure resistance, a complex impedance (capacitive or inductive) may be used as the transmit frequency cancellation impedance 371 to provide for further tuning that may account for imperfections in any of the components used in the implementation (e.g. the filters). At receive frequency, there is typically some loss in the transmit frequency cancellation impedance 371, at least if a resistance is used. In some embodiments, the transmit frequency cancellation impedance 371 is complex and designed to have a large impedance value at the receive frequency to minimize the loss.

The function and structure of the transmit frequency cancellation impedance 372 is very similar to that of the transmit frequency cancellation impedance 371 and will not be described in detail.

The receive frequency cancellation impedance 362 is adapted to produce a signal that, when it is joined (added, merged, or similar) with the signal leaked through the receive frequency suppression filter 341, causes the leaked receive frequency signal to be cancelled or at least reduced. Thus, it may be desirable that the receive frequency cancellation impedance 362 produces a signal current having equal magnitude and opposite phase (at receive frequency) as the receive frequency signal leaked through the receive frequency suppression filter 341. If a pure resistance is used as the receive frequency cancellation impedance 362, the resistance value may be chosen so that the amplitude of the produced current matches the amplitude of the signal leaked through the receive frequency suppression filter 341 and the cross-coupling of the receive frequency cancellation impedance 362 from the second transmitter node 333 to the first signal transmission and reception arrangement node 312 results in an opposite phase current, as desired. Instead of a pure resistance, a complex impedance (capacitive or inductive) may be used as the receive frequency cancellation impedance 362 to provide for further tuning that may account for imperfections in any of the components used in the implementation. At transmit frequency, there is typically some loss in the receive frequency cancellation impedance 362, at least if a resistance is used. In some embodiments, the receive frequency cancellation impedance 362 is complex and designed to have a large impedance value at the transmit frequency to minimize the loss.

The function and structure of the receive frequency cancellation impedance 361 is very similar to that of the receive frequency cancellation impedance 362 and will not be described in detail.

If the filters are realized using series path only, and no shunt paths, and if the values of the cross coupled impedances/resistors are made equal to the impedance/resistance of the corresponding filters, then a perfect cancellation is created (at least if the signals of the respective differential ports of the transmitter and of the signal transmission and reception arrangement are perfectly equal magnitude, opposite phase), which results in infinite isolation at the corresponding filter resonance frequency.

One or more of the filters 341, 342, 351, 352 and the impedances 361, 362, 371, 372 may be tunable (e.g. during use of the transceiver front-end), for example, by using tunable components such as variable resistances and/or variable capacitances. The tuning may, for example, be useful to adjust to various frequencies or frequency bands and/or to component imperfections (e.g. due to manufacturing tolerances, temperature changes and aging).

It is noteworthy that using two cross-couplings (one between the signal transmission and reception arrangement and the receiver and one between the signal transmission and reception arrangement and the transmitter) results in that the isolation with cancellation construction is not sensitive to the impendence (neither its value nor any variations in it) of the signal transmission and reception arrangement. Thus, when this construction is used the impedance of the signal transmission and reception arrangement need not be compensated for or tracked to achieve cancellation (even though signal transmission and reception arrangement impedance matching may be needed to optimize signal power levels). Having only a single cross-coupling (connected between the transmitter and the receiver), the antenna impedance would affect the signal transfer between transmitter and receiver through the filters and the above benefit would be lost.

Further, the differential structure makes this construction highly suitable in system-on-chip environments due to its interference immunity.

An alternative to using the impedances 361, 362, 371, 372 is to use cancellation transconductances. In some embodiments, the cancellation transconductances may be unilateral. This typically makes the implementation of the transconductance easier and is possible when there is no or little need for cancellation of signals leaked from the receiver to the signal transmission and reception arrangement and from the signal transmission and reception arrangement to the transmitter. Using cancellation transconductances will be elaborated on further in connection with an alternative embodiment presented in FIG. 5.

Figure 4:
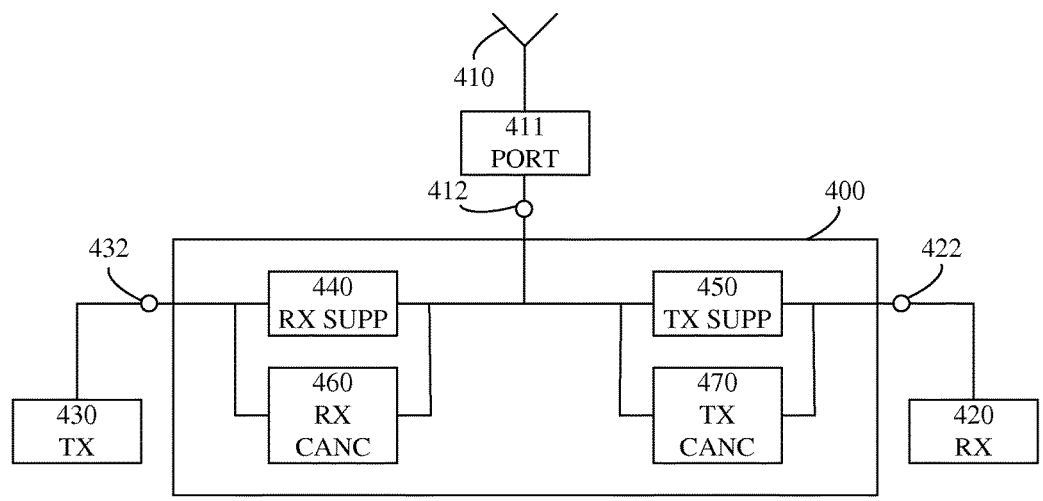
FIG. 4 is a schematic drawing illustrating another example transceiver arrangement according to some embodiments.

FIG. 4 illustrates an example transceiver arrangement according to some embodiments. This example transceiver arrangement comprises a receiver (RX) 420, a transmitter (TX) 430, a signal transmission and reception arrangement 410 with a signal transmission and reception arrangement port (PORT, e.g. an antenna port) 411, and a transceiver front-end 400.

The transceiver front-end 400 is connectable to the signal transmission and reception arrangement 410 via the signal transmission and reception arrangement port 411 at a signal transmission and reception arrangement node 412. The transceiver front-end 400 is also connectable to the transmitter 430 at a transmitter node 432 and to the receiver 420 at a receiver node 422. Thus, this example transceiver comprises a single-ended structure of the transmitter output, the receiver input and of the signal transmission and reception arrangement port.

The transceiver front-end 400 comprises a transmit frequency suppression filter arrangement (TX SUPP) 450, a transmit frequency cancellation arrangement (TX CANC) 470, a receive frequency suppression filter arrangement (RX SUPP) 440 and a receive frequency cancellation arrangement (RX CANC) 460.

The transmit frequency suppression filter arrangement 450 is connected between the signal transmission and reception arrangement node 412 and the receiver node 422 and is adapted to suppress transfer of a signal having the transmit frequency and to pass a signal having the receive frequency. The receive frequency suppression filter arrangement 440 is connected between the signal transmission and reception arrangement node 412 and the transmitter node 432 and is adapted to suppress transfer of a signal having the receive frequency and to pass a signal having the transmit frequency. Structural examples of the transmit and receive frequency suppression filter arrangements 450, 440 will be given in connection to FIGS. 5, 6A and 6B.

The transmit frequency cancellation arrangement 470 is connected between the signal transmission and reception arrangement node 412 and the receiver node 422 and is adapted to produce a transmit frequency cancellation signal to cancel out (or at least decrease) signals having the transmit frequency at the receiver node 422. The receive frequency cancellation arrangement 460 is connected between the signal transmission and reception arrangement node 412 and the transmitter node 432 and is adapted to produce a receive frequency cancellation signal to cancel out (or at least decrease) unwanted signals having the receive frequency—i.e. receive frequency signals produced by the transmitter 430—at the signal transmission and reception arrangement node 412 (and thereby also at the receiver node 422). Structural examples of the transmit and receive frequency cancellation arrangements 470, 460 will be given in connection to FIG. 5.

Figure 5:
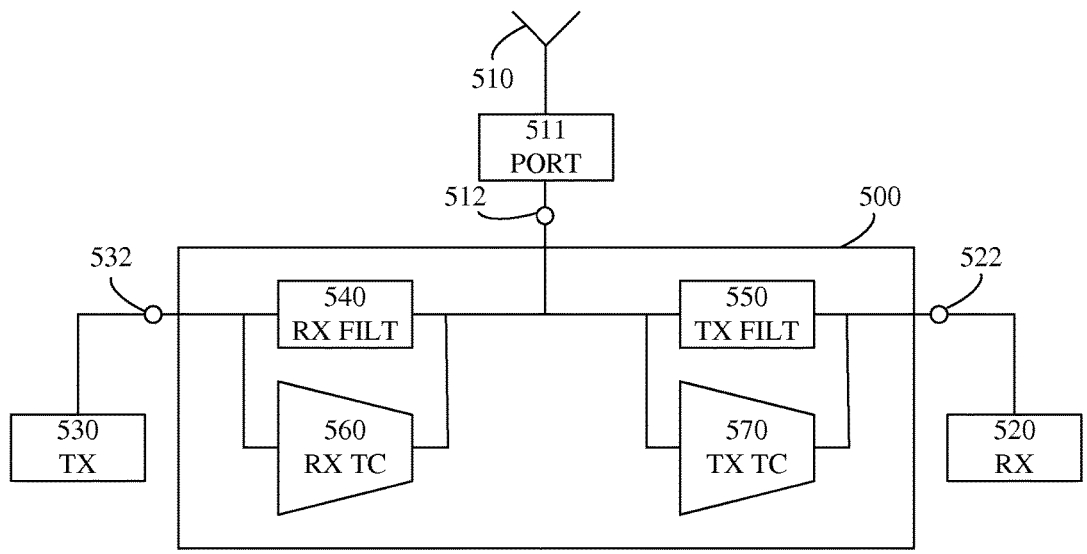
FIG. 5 is a schematic drawing illustrating a detailed example transceiver arrangement according to some embodiments.

FIG. 5 illustrates an example transceiver arrangement according to some embodiments. This example transceiver arrangement comprises a receiver (RX) 520, a transmitter (TX) 530, a signal transmission and reception arrangement 510 with a signal transmission and reception arrangement port (PORT, e.g. an antenna port) 511, and a transceiver front-end 500. The transceiver front-end 500 may be seen as an example implementation of the transceiver front-end 400 of FIG. 4.

Similarly to the transceiver front-end 400 of FIG. 4, the transceiver front-end 500 is connectable to the signal transmission and reception arrangement 510 via the signal transmission and reception arrangement port 511 at a signal transmission and reception arrangement node 512. The transceiver front-end 500 is also connectable to the transmitter 530 at a transmitter node 532 and to the receiver 520 at a receiver node 522.

The transceiver front-end 500 comprises one transmit frequency suppression filter (TX FILT) 550, forming a transmit frequency suppression filter arrangement, and one receive frequency suppression filter (RX FILT) 540, forming a receive frequency suppression filter arrangement.

The transmit frequency suppression filter 550 is connected between the signal transmission and reception arrangement node 512 and the receiver node 522. Similarly, the receive frequency suppression filter 540 is connected between the signal transmission and reception arrangement node 512 and the transmitter node 532.

The transmit frequency suppression filter 550 is adapted to suppress transfer of a signal having the transmit frequency and to pass a signal having the receive frequency. Typically, the transmit frequency suppression filter is adapted to have a higher impedance value at the transmit frequency than at the receive frequency. The receive frequency suppression filter 540 is adapted to suppress transfer of a signal having the receive frequency and to pass a signal having the transmit frequency. Typically, the receive frequency suppression filter is adapted to have a higher impedance value at the receive frequency than at the transmit frequency. Structural examples of the transmit and receive frequency suppression filters 550, 540 will be given in connection to FIGS. 6A and 6B.

The transceiver front-end 500 also comprises a transmit frequency cancellation transconductance (TX TC) 570, forming a transmit frequency cancellation arrangement, and a receive frequency cancellation transconductance (RX TC) 560, forming a receive frequency cancellation arrangement.

The transmit frequency cancellation conductance 570 is connected between the signal transmission and reception arrangement node 512 and the receiver node 522. Similarly, the receive frequency cancellation transconductance 560 is connected between the signal transmission and reception arrangement node 512 and the transmitter node 532.

In some embodiments, the transmit frequency cancellation transconductance 570 may be unilateral as indicated in FIG. 5. This typically makes the implementation of the transconductance easier and is possible since there is no or little need for cancellation of transmit frequency signals leaked from the receiver to the signal transmission and reception arrangement.

The transmit frequency cancellation transconductance 570 is adapted to produce a signal that, when it is joined (added, merged, or similar) with the signal leaked through the transmit frequency suppression filter 550, causes the leaked transmit frequency signal to be cancelled or at least reduced. Thus, it may be desirable that the transmit frequency cancellation transconductance 570 produces a signal current having equal magnitude and opposite phase (at transmit frequency) as the transmit frequency signal leaked through the transmit frequency suppression filter 550. If an inverting transconductor $(-g_m)$ is used as the transmit frequency cancellation transconductance 570, the absolute transconductance value may be chosen so that the amplitude of the produced current matches the amplitude of the signal leaked through the transmit frequency suppression filter 550 and the inverting function of the inverting transconductor results in an opposite phase current, as desired. At receive frequency, there is typically some loss in the transmit frequency cancellation transconductor 570. The loss for a unilateral transconductance is typically (at least slightly) lower than for a resistor. On the other hand, a transconductor may result in higher power consumption, higher noise and/or non-linearity. In some embodiments, the transmit frequency cancellation transconductance 570 is complex and designed to have a low transconductance value at the receive frequency to minimize the loss.

In some embodiments, the receive frequency cancellation transconductance 560 may be unilateral as indicated in FIG. 5. This typically makes the implementation of the transconductance easier and is possible when there is no or little need for cancellation of receive frequency signals leaked from the signal transmission and reception arrangement to the transmitter.

The receive frequency cancellation transconductance 560 is adapted to produce a signal that, when it is joined (added, merged, or similar) with the signal leaked through the receive frequency suppression filter 540, causes the leaked receive frequency signal to be cancelled or at least reduced. Thus, it may be desirable that the receive frequency cancellation transconductance 560 produces a signal current having equal magnitude and opposite phase (at receive frequency) as the receive frequency signal leaked through the receive frequency suppression filter 540. If an inverting transconductor is used as the receive frequency cancellation transconductance 560, the absolute transconductance value may be chosen so that the amplitude of the produced current matches the amplitude of the signal leaked through the receive frequency suppression filter 540 and the inverting function of the inverting transconductor results in an opposite phase current, as desired. At transmit frequency, there is typically some loss in the receive frequency cancellation transconductance 560. In some embodiments, the receive frequency cancellation transconductance 560 is complex and designed to have a low transconductance value at the transmit frequency to minimize the loss.

One or more of the filters 540, 550 and the transconductances 560, 570 may be tunable (e.g. during use of the transceiver front-end), for example, by using tunable components such as variable resistances and/or variable capacitances. The tuning may, for example, be useful to adjust to various frequencies or frequency bands and/or to component imperfections (e.g. due to manufacturing tolerances, temperature changes and aging).

It is noteworthy that using two cancellation paths (one between the signal transmission and reception arrangement and the receiver and one between the signal transmission and reception arrangement and the transmitter) results in that the isolation with cancellation construction is not sensitive to the impendence of the signal transmission and reception arrangement.

The structure of FIG. 5 may, according to some embodiments also be used when a transceiver comprises a differential structure of the transmitter output, the receiver input and of the signal transmission and reception arrangement port. Such an example would be if the transceiver front-end implementation of FIG. 5 was connected to a first transmitter node, a first receiver node and a first signal transmission and reception arrangement node of the differential structure, and if the instances of the filters 540, 550, the transconductances, and their mutual connections were repeated and the repeated construction was connected to a second transmitter node, a second receiver node and a second signal transmission and reception arrangement node of the differential structure.

Figure 6A:
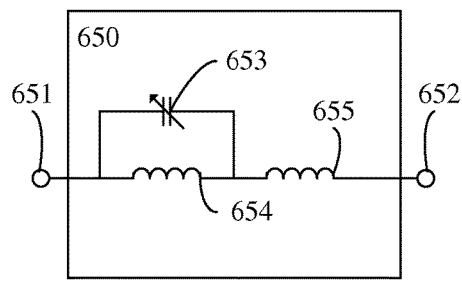
FIG. 6A is a schematic drawing illustrating an example filter arrangement according to some embodiments.
Figure 6B:
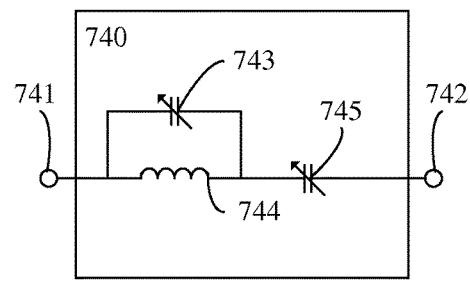
FIG. 6B is a schematic drawing illustrating another example filter arrangement according to some embodiments.

FIGS. 6A and 6B each illustrate an example filter arrangement according to some embodiments. The filters illustrated in FIGS. 6A and 6B may, for example, be used as filters 341, 342, 351, 352 of FIG. 3 and/or as filters 540 and 550 of FIG. 5.

FIG. 6A illustrates a filter construction 650 having first and second connection nodes 651, 652. The filter construction 650 comprises a first inductance 654 and a first capacitance 653 connected in parallel to the connection node 651, and forming a suppression frequency resonance arrangement. The filter construction 650 also comprises a second inductance 655 connected in series with the parallel arrangement to the connection node 652, and forming a pass frequency resonance arrangement with the first resonator. The pass frequency range of the filter construction 650 (i.e. where the impedance of the filter construction is low) comprises frequencies in a frequency range that lies above the suppression frequency range of the filter construction 650 (i.e. where the impedance of the filter construction is high). One example filter transfer characteristic of the filter construction 650 has a peak at a first frequency and a notch at a second frequency (where the second frequency is lower than the first frequency).

FIG. 6B illustrates a filter construction 740 having first and second connection nodes 741, 742. The filter construction 740 comprises a first inductance 744 and a first capacitance 743 connected in parallel to the connection node 741, and forming a suppression frequency resonance arrangement. The filter construction 740 also comprises a second capacitance 745 connected in series with the parallel arrangement to the connection node 742, and forming a pass frequency resonance arrangement with the first inductance. The pass frequency range of the filter construction 740 (i.e. where the impedance of the filter construction is low) comprises frequencies in a frequency range that lies below the suppression frequency range of the filter construction 740 (i.e. where the impedance of the filter construction is high). One example filter transfer characteristic of the filter construction 740 has a peak at a first frequency and a notch at a second frequency (where the second frequency is higher than the first frequency).

Each of the capacitances (e.g. capacitors 653, 743, 745 of FIGS. 6A and 6B and/or any capacitor of the cancellation arrangements) may comprise one or several capacitors. For example, any of the capacitances may comprise a single variable capacitor, an array of switched capacitors (each possibly non-variable), a combination of a non-variable capacitor and an array of switched capacitors (each possibly non-variable). In some embodiments, a filter capacitance (e.g. capacitors 653, 743, 745) may be selected to comprise one capacitance with a course step for a possibility to tune the filter arrangement to different frequency bands. The capacitance may additionally comprise a bank of smaller capacitances to provide coverage of the full bandwidth of each frequency band.

Similar considerations are valid for resistances according to some embodiments. Thus, each of the resistances (e.g. any resistor of the cancellation arrangements) may comprise one or several resistors. For example, a resistance may comprise an array of switched resistors.

If the transmit frequency is lower than the receive frequency, a filter construction that has a pass frequency range at lower frequencies than a suppression frequency range (e.g. the filter construction 740) may be used as receive frequency suppression filters 341, 342 and 540 and a filter construction that has a pass frequency range at higher frequencies than a suppression frequency range (e.g. the filter construction 650) may be used as transmit frequency suppression filters 351, 352 and 550. If on the other hand the transmit frequency is higher than the receive frequency, a filter construction that has a pass frequency range at lower frequencies than a suppression frequency range (e.g. the filter construction 740) may be used as transmit frequency suppression filters 351, 352 and 550 and a filter construction that has a pass frequency range at higher frequencies than a suppression frequency range (e.g. the filter construction 650) may be used as receive frequency suppression filters 341, 342 and 540.

Figure 7A:
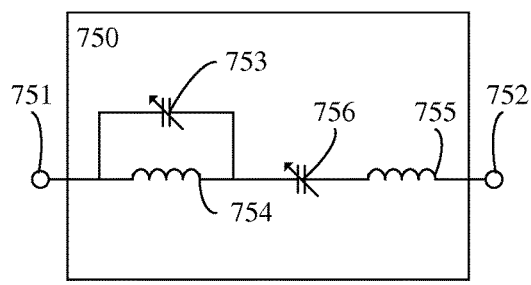
FIG. 7A is a schematic drawing illustrating an example filter arrangement according to some embodiments.
Figure 7B:
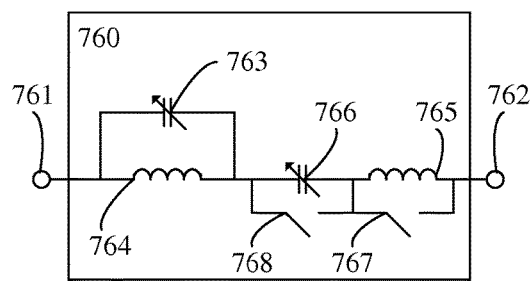
FIG. 7B is a schematic drawing illustrating another example filter arrangement according to some embodiments.

If a construction should be able to handle both cases (receive frequency higher than transmit frequency and vice versa), two isolation structure implementations may be incorporated into a single transceiver front-end. Alternatively or additionally, one or more of the suppression filters may be implemented via a structure that enable switching of the relative positions of the pass frequency range and the suppression frequency range. FIGS. 7A and 7B each illustrate a respective example filter construction that provide such a possibility.

FIG. 7A illustrates a filter construction 750 having first and second connection nodes 751, 752. The filter construction 750 comprises a first inductance 754 and a first capacitance 753 connected in parallel to the connection node 751, and forming a suppression frequency resonance arrangement. The filter construction 750 also comprises a second inductance 755 and a second capacitance 756 connected in series with each other, the parallel arrangement and to the connection node 752, and forming a pass frequency resonance arrangement with the first resonator. The relative positions of the pass frequency range and the suppression frequency range of the filter construction 750 may be varied, for example, by varying the value of the second capacitance 756. For example, if a low capacitance value is used the function of the filter construction 750 may approach the function of the filter construction 740 of FIG. 6B. Similarly, if a high capacitance value is used the function of the filter construction 750 may approach the function of the filter construction 650 of FIG. 6A.

FIG. 7B illustrates a filter construction 760 having first and second connection nodes 761, 762. The filter construction 760 comprises a first inductance 764 and a first capacitance 763 connected in parallel to the connection node 761, and forming a suppression frequency resonance arrangement. The filter construction 760 also comprises a second inductance 765 and a second capacitance 766 connected in series with each other, the parallel arrangement and to the connection node 762, and forming a pass frequency resonance arrangement with the first resonator. The relative positions of the pass frequency range and the suppression frequency range of the filter construction 760 may be varied by application of one or more switches 767, 768. For example, if the switch 767 is closed while the switch 768 is open the function of the filter construction 750 may correspond to the function of the filter construction 740 of FIG. 6B. Similarly, if the switch 767 is open while the switch 768 is closed the function of the filter construction 750 may correspond to the function of the filter construction 650 of FIG. 6A.

In a variant of the filter construction 760, the switch 768 is removed. In such a variant, if the switch 767 is closed the function of the filter construction 750 may correspond to the function of the filter construction 740 of FIG. 6B. If the switch 767 is open and a high capacitance value is used for 766 the function of the filter construction 750 may approach the function of the filter construction 650 of FIG. 6A.

References herein to the filter constructions of FIGS. 6A and 6B may be equally applicable to the filter constructions of any of FIGS. 7A and 7B.

It should be noted that the filter constructions of FIGS. 6A and 6B are merely examples and that any suitable known or future filter design may be used in various embodiments. For example, any filter that is adapted to suppress transfer of a signal having the transmit frequency and to pass a signal having the receive frequency (e.g. by having a higher impedance value at the transmit frequency than at the receive frequency) may be used as filters 351, 352 and 550. Similarly, any filter that is adapted to suppress transfer of a signal having the receive frequency and to pass a signal having the transmit frequency (e.g. by having a higher impedance value at the receive frequency than at the transmit frequency) may be used as filters 341, 342 and 540. In some embodiments, such as the ones of FIGS. 6A and 6B, filters may be realized using inductors and capacitors, where the capacitors are programmable so that the filters can be tuned to different frequency bands. Typically, the filter design is a trade-off between using a filter that fulfills the pass/suppression tasks indicated above extremely well and using a filter with simple implementation, low power consumption and low insertion loss in the pass band.

Using a transceiver front-end structure according to FIG. 3, filters according to FIG. 6A as transmit frequency suppression filters and filters according to FIG. 6B as receive frequency suppression filters, the following simulation results have been achieved. It was assumed that high quality factor external inductors can be used, and that the programmable capacitors are implemented on-chip. The inductor 744 of the filter construction 740 was set to 1 nH, and the inductors 654 and 655 of the filter construction 650 were set to 1 nH and 6 nH, respectively. The capacitors were chosen according to the table below, where the band number notation follows the $3^{rd}$ Generation Partnership Project (3GPP) specifications, C1 and C2 are the capacitors 743 and 745 respectively of the filter construction 740 and C3 is the capacitor 653 of the filter construction 650.

| Band # | TX freq. (MHz) | RX freq. (MHz) | C1 (pF) | C2 (pF) | C3 (pF) |
| --- | --- | --- | --- | --- | --- |
| 1 | 1950 | 2140 | 5.52 | 1 | 6.67 |
| 2 | 1880 | 1960 | 6.58 | 1 | 7.717 |
| 3 | 1750 | 1845 | 7.44 | 1 | 8.28 |
| 7 | 2535 | 2655 | 3.59 | 0.4 | 3.95 |
| 10 | 1740 | 2140 | 5.52 | 1 | 8.35 |

It may be noted that a capacitance tuning ratio of 2.5 times is sufficient to be able to cover the bands in the example. Omitting band 7, a ratio of 1.35 would be sufficient for C1, a ratio of 1.25 would be sufficient for C3, and C2 can be fixed (non-programmable).

The following table summarizes the simulation results. The reported isolation is the minimum isolation over a 5 MHz channel, simulated at both TX and RX frequency for the 170 Ohm differential ports case.

| Band # | TX loss (dB), 100 ohm ports | RX loss (dB), 100 ohm ports | TX loss (dB), 170 ohm ports | RX loss (dB), 170 ohm ports | Isolation TX (dB) | Isolation RX (dB) |
|---|---|---|---|---|---|---|
| 1 | 2.2 | 1.9 | 2.6 | 2.5 | 39 | 40 |
| 2 | 4.6 | 4.5 | 4.2 | 4.1 | 38 | 40 |
| 3 | 3.4 | 3.0 | 3.5 | 3.3 | 38 | 38 |
| 7 | 4.4 | 4.4 | 4.1 | 3.8 | 43 | 43 |
| 10 | 3.1 | 2.7 | 3.0 | 2.7 | 37 | 41 |

One possible conclusion is that it may be possible to some extent to trade losses in different bands against each other. In the example above such a trade-off is achieved by varying the respective receiver and transmitter port impedances, but a trade-off may also be achieved, for example, by scaling the impedance level (e.g. inductance and capacitance impedances) of the filters. In the example above, the two most problematic bands may be #2 and #7. By increasing the port impedances, the losses of these bands were reduced mainly at the expense of band #1 (which still has the lowest loss).

Figure 8:
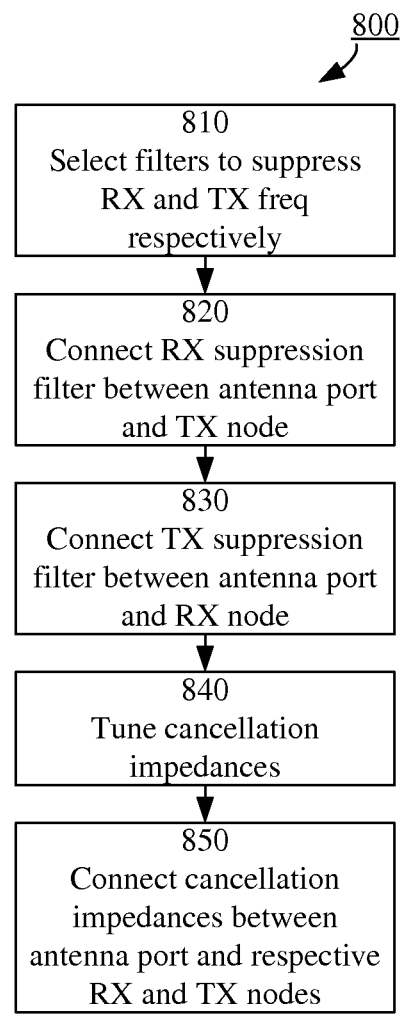
FIG. 8 is a flowchart illustrating example method steps according to some embodiments.

FIG. 8 is a flowchart illustrating an example method 800 for minimizing signal leakage from a transmitter to a receiver in a receiver front-end of a transceiver of a communication device according to some embodiments. Similarly as has been described in connection to FIGS. 2, 3, 4, and 5, the transceiver front-end is connectable at one or more signal transmission and reception arrangement nodes to a signal transmission and reception arrangement adapted to transmit a transmit signal having a transmit frequency and to receive a receive signal having a receive frequency, at one or more transmitter nodes to a transmitter adapted to produce the transmit signal, and at one or more receiver nodes to a receiver adapted to process the receive signal.

The method starts in 810, where filters for suppression of receive and transmit frequency signals respectively are selected. For example, the filter constructions as described in connection to FIGS. 6A and 6B may be used in some embodiments. The selected filters are used to construct a transmit frequency suppression filter arrangement adapted to suppress transfer of a signal having the transmit frequency and to pass a signal having the receive frequency and a receive frequency suppression filter arrangement adapted to suppress transfer of a signal having the receive frequency and to pass a signal having the transmit frequency. For example, the filter arrangements as described in connection to any of FIGS. 2, 3, 4 and 5 may be used in some embodiments.

In 820 of method 800, the receive frequency suppression filter arrangement is connected between the transmitter node(s) and the signal transmission and reception node(s) and in 830 of method 800, the transmit frequency suppression filter arrangement is connected between the signal transmission and reception node(s) and the receiver node(s).

In 840 of method 800, cancellation paths are constructed for cancellation of any leaked unwanted signal. Thus, a transmit frequency cancellation arrangement is constructed for provision of one or more signals for cancellation, at the receiver nodes, of a signal having the transmit frequency and leaked by the transmit frequency suppression filter arrangement. Similarly, a receive frequency cancellation arrangement is constructed for provision of one or more signals for cancellation, at the signal transmission and reception nodes, of a signal having the receive frequency and leaked by the receive frequency suppression filter arrangement. The cancellation paths may, for example, comprise impedances and/or transconductances and may be adapted to supply a signal that has a current of equal magnitude and opposite phase compared to the leaked signal for cancellation. For example, the cancellation arrangements as described in connection to any of FIGS. 2, 3, 4 and 5 may be used in some embodiments.

In 850 of method 800, the receive frequency cancellation arrangement is connected between the transmitter node(s) and the signal transmission and reception node(s) and the transmit frequency cancellation arrangement is connected between the signal transmission and reception node(s) and the receiver node(s).

For an example differential transceiver implementation (see e.g. FIG. 3), 820 of method 800 comprises connecting a first transmit frequency suppression filter between a first signal transmission and reception arrangement node and a first receiver node and connecting a second transmit frequency suppression filter between a second signal transmission and reception arrangement node and a second receiver node. Similarly, 830 of method 800 comprises connecting a first receive frequency suppression filter between the first signal transmission and reception arrangement node and a first transmitter node and connecting a second receive frequency suppression filter between the second signal transmission and reception arrangement node and a second transmitter node. In this example, 850 of 800 comprises connecting a first transmit frequency cancellation impedance between the second signal transmission and reception arrangement node and the first receiver node, connecting a second transmit frequency cancellation impedance between the first signal transmission and reception arrangement node and the second receiver node, connecting a first receive frequency cancellation impedance between the second signal transmission and reception arrangement node and the first transmitter node, and connecting a second receive frequency cancellation impedance between the first signal transmission and reception arrangement node and the second transmitter node.

For an example single-ended transceiver implementation (see e.g. FIG. 5), 820 of method 800 comprises connecting a transmit frequency suppression filter between the signal transmission and reception arrangement node and the receiver node and 830 of method 800 comprises connecting a receive frequency suppression filter between the signal transmission and reception arrangement node and the transmitter node. In this example, 850 of 800 comprises connecting an inverting transconductor forming a transmit frequency cancellation transconductance between the signal transmission and reception arrangement node and the receiver node, and connecting an inverting transconductor forming a receive frequency cancellation transconductance between the signal transmission and reception arrangement node and the transmitter node.

Other details of the method may be extracted from the transceiver embodiments described above.

A transceiver front-end may comprise a single structure according to the embodiments (e.g. any of the structures of FIGS. 2, 3, 4 and 5) or may comprise two or more of such structures (for example to be able to cover a wide range of frequencies and/or different relations between receive and transmit frequencies).

A transceiver front-end of embodiments may be comprised in a transceiver (also comprising a receiver, a transmitter and possibly a signal transmission and reception arrangement). A transceiver front-end or transceiver may in turn be comprised in a wireless communication device.

The described embodiments and their equivalents may be realized in hardware. They may be performed by specialized circuits such as for example application-specific integrated circuits (ASIC), by discrete components, or by a combination thereof. All such forms are contemplated to be within the scope of the invention.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a communicator, an electronic organizer, a smartphone, a computer, a notebook, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the limitations of the described embodiments are merely for illustrative purpose and by no means limiting. Instead, all variations that fall within the range of the claims are intended to be embraced therein.

The invention claimed is:

1. A transceiver front-end for a communication device, connectable:
   at a first and a second signal transmission and reception arrangement node to a signal transmission and reception arrangement adapted to transmit a transmit signal having a transmit frequency and to receive a receive signal having a receive frequency;
   at a first and a second transmitter node to a transmitter adapted to produce the transmit signal; and
   at a first and a second receiver node to a receiver adapted to process the receive signal;
   the transceiver front-end comprising:
   a transmit frequency suppression filter arrangement connected to the first and the second signal transmission and reception arrangement nodes and to the first and the second receiver nodes, wherein the transmit frequency suppression filter arrangement is adapted to suppress transfer of a signal having the transmit frequency and to pass a signal having the receive frequency, and wherein the transmit frequency suppression filter arrangement comprises a first transmit frequency suppression filter connected between the first signal transmission and reception arrangement node and the first receiver node, and a second transmit frequency suppression filter connected between the second signal transmission and reception arrangement node and the second receiver node;
   a transmit frequency cancellation arrangement connected to the first and the second signal transmission and reception arrangement nodes and to the first and the second receiver nodes, wherein the transmit frequency cancellation arrangement is adapted to produce one or more first cancellation signals for cancellation, at the first and the second receiver nodes, of a suppressed signal having the transmit frequency, transferred by the transmit frequency suppression filter arrangement, wherein the transmit frequency cancellation arrangement comprises a first transmit frequency cancellation impedance connected between the second signal transmission and reception arrangement node and the first receiver node and a second transmit frequency cancellation impedance connected between the first signal transmission and reception arrangement node and the second receiver node;
   a receive frequency suppression filter arrangement connected to the first and the second signal transmission and reception arrangement nodes and to the first and the second transmitter nodes, wherein the receive frequency suppression filter arrangement is adapted to suppress transfer of a signal having the receive frequency and to pass a signal having the transmit frequency, wherein the receive frequency suppression filter arrangement comprises a first receive frequency suppression filter connected between the first signal transmission and reception arrangement node and the first transmitter node and a second receive frequency suppression filter connected between the second signal transmission and reception arrangement node and the second transmitter node; and
   a receive frequency cancellation arrangement connected to the first and the second signal transmission and reception arrangement nodes and to the first and the second transmitter nodes, wherein the receive frequency cancellation arrangement is adapted to produce one or more second cancellation signals for cancellation, at the first and the second signal transmission and reception arrangement nodes, of a suppressed signal having the receive frequency, transferred by the receive frequency suppression filter arrangement, wherein the receive frequency cancellation arrangement comprises a first receive frequency cancellation impedance connected between the second signal transmission and reception arrangement node and the first transmitter node, and a second receive frequency cancellation impedance connected between the first signal transmission and reception arrangement node and the second transmitter node,
   wherein the first and the second transmit frequency cancellation impedance form a first cross-coupling of impedances across the first and the second transmit frequency suppression filter, and wherein the first and the second receive frequency cancellation impedance form a second cross-coupling of impedances across the first and the second receive frequency suppression filter.

2. The transceiver front-end of claim 1, wherein:
   the receive frequency suppression filter arrangement is adapted to have a higher impedance value at the receive frequency than at the transmit frequency.

3. The transceiver front-end of claim 1, wherein:
   the transmit frequency cancellation arrangement is adapted to produce the first cancellation signals as one or more currents having opposite phase and equal magnitude as a respective current of the suppressed signal having the transmit frequency; and the receive frequency cancellation arrangement is adapted to produce the second cancellation signals as one or more currents having opposite phase and equal magnitude as a respective current of the suppressed signal having the receive frequency.

4. The transceiver front-end of claim 3, further adapted to join each of the first cancellation signal currents with its respective current of the suppressed signal having the transmit frequency and to join each of the second cancellation signal currents with its respective current of the suppressed signal having the receive frequency.

5. The transceiver front-end of claim 1, further comprising:

a first signal adder adapted to, for each of the one or more first cancellation signals:

add the first cancellation signal to a respective suppressed signal having the transmit frequency and transferred by the transmit frequency suppression filter arrangement; and output a first further suppressed signal having a magnitude that is lower than a magnitude of the respective suppressed signal having the transmit frequency; and a second signal adder adapted to, for each of the one or more second cancellation signals:

add the second cancellation signal to a respective suppressed signal having the receive frequency and transferred by the receive frequency suppression filter arrangement; and output a second further suppressed signal having a magnitude that is lower than a magnitude of the respective suppressed signal having the receive frequency.

6. The transceiver front-end of claim 5, wherein at least one of the magnitude of the first further suppressed signal and the magnitude of the second further suppressed signal is equal to zero.

7. The transceiver front-end of claim 1, wherein each of the cancellation arrangements comprises:

one or more impedances; and one or more transconductances.

8. The transceiver front-end of claim 1, wherein each of the suppression filters comprises:

a first inductance connected in parallel with a first capacitance to form a suppression frequency resonance arrangement.

9. The transceiver front-end of claim 8, wherein each of the suppression filters further comprises:

at least one of a second inductance and a second capacitance connected in series with the suppression frequency resonance arrangement to form a pass frequency resonance arrangement.

10. The transceiver front-end of claim 1, wherein each of the suppression filter arrangements and the cancellation arrangements is tunable during use of the transceiver front-end.

11. A transceiver comprising the transceiver front-end of claim 1, and further comprising the transmitter and the receiver.

12. The transceiver of claim 11, further comprising the signal transmission and reception arrangement.

13. A communication device comprising the transceiver of claim 11.

* * * * *